United States Patent [19]

McBride

[11] Patent Number: 5,234,986
[45] Date of Patent: Aug. 10, 1993

[54] HOT-MELT ADHESIVES FOR PVC WITH GOOD HIGH TEMPERATURE UTILITY

[75] Inventor: Edward McBride, Wilmington, Del.

[73] Assignee: E. I. Du Pont de Nemours and Company, Wilmington, Del.

[21] Appl. No.: 844,327

[22] Filed: Mar. 2, 1992

[51] Int. Cl.$^5$ ............................................. C09J 123/08
[52] U.S. Cl. ..................................... 524/505; 524/523; 524/524; 524/539
[58] Field of Search ............... 524/505, 539, 523, 524; 525/92

[56] References Cited

U.S. PATENT DOCUMENTS

| | | | |
|---|---|---|---|
| 3,718,715 | 2/1973 | Crawford et al. | 525/173 |
| 3,780,140 | 12/1973 | Hammer | 525/185 |
| 4,275,180 | 6/1981 | Clarke | 525/173 |
| 4,434,258 | 2/1984 | Schumacher et al. | 524/449 |
| 4,739,012 | 4/1988 | Hagman | 525/92 |
| 5,091,478 | 2/1992 | Saltman | 525/179 |

FOREIGN PATENT DOCUMENTS

| | | |
|---|---|---|
| 0455412 | 11/1991 | European Pat. Off. . |
| 3160085 | 11/1989 | Japan . |
| 3181557 | 11/1989 | Japan . |
| WO9118043 | 11/1991 | PCT Int'l Appl. . |

*Primary Examiner*—Joseph L. Schofer
*Assistant Examiner*—R. H. Delmendo
*Attorney, Agent, or Firm*—Craig H. Evans

[57] ABSTRACT

Copolymers of ethylene with such monomers as an alkyl acrylate and carbon monoxide or with vinyl acetate alone are blended with a thermoplastic block-polyester elastomer and a tackifier to produce thermally stable, hot-melt adhesive compositions which adhere well to polyvinyl chloride and which retain adhesivity at elevated temperatures. Fillers, plasticizers and compatible waxes may also be present in the composition.

11 Claims, No Drawings

HOT-MELT ADHESIVES FOR PVC WITH GOOD HIGH TEMPERATURE UTILITY

BACKGROUND OF THE INVENTION

1. Field of the Invention

This invention relates to ethylene copolymer based hot-melt adhesives which retain good adhesion at elevated temperatures, and more specifically it relates to such adhesives formulated from a blend of certain specified ethylene copolymers with thermoplastic block-polyester elastomers, together with a tackifier. The adhesives are particularly useful for use with unprimed polyvinyl chloride (PVC) based substrates.

2. Description of Related Art

Use of adhesives applied as a hot melt is growing rapidly because hot melts allow fast production speeds. However, for many applications, limited temperature resistance of hot-melt adhesives is a major deficiency. This is the result of seemingly contrasting requirements. Hot-melt application requires high fluidity at application temperatures, yet adhesive strength at high temperatures requires a strength which any fluidity would preclude.

While hot-melt adhesives with a broad range of viscosities are known, viscosities required for hot-melt application are considerably less than those employed in common plastic forming operations such as molding and extrusion. As a result, formulation with low viscosity additives is commonly employed. While such additives have other functions as well, they 'dilute' the polymer properties. Use of lower molecular weight polymers also reduces viscosity but results in adhesives with less 'guts'. The combination of fluidity, strength and high-temperature utility is thus a major challenge for hot-melt adhesives.

Adhesives are, to a significant extent, substrate specific. When an adhesive composition does not adhere well to a specific substrate, adhesion can be improved to some extent by 'priming' the substrate. This is often the case with rigid PVC. However, it is more desirable and less expensive not to have to prime a substrate. When the substrate is not primed, adhesiveness to a substrate requires a certain chemical 'compatibility' with that substrate. For PVC, known hot-melt adhesives include ethylene copolymers at the low-cost, low-performance end and certain polyamides and certain types of polyesters at the high-cost, high-performance end. Polyamide hot-melts, useful for PVC, have good temperature resistance. However they are expensive and are moisture sensitive.

Ethylene/vinyl acetate copolymers were among the earliest hot melt adhesives. They may be used as PVC adhesives, and with moderate to high levels of vinyl acetate adhere to PVC without priming the PVC. Terpolymers of ethylene, esters of unsaturated carboxylic acids and carbon monoxide have also been disclosed as adhesives for unprimed PVC and are described in Japanese Laid Open Application No. J3-160085.

U.S. Pat. No. 3,780,140 (Hammer) discloses such terpolymers as being 'compatible' with PVC, and in certain composition ranges useful as plasticizers for PVC which, it is noted, implies actual molecular miscibility. Ethylene/n-butyl acrylate/carbon monoxide copolymer is exemplified.

Japanese Laid Open Application No. J3-181557 describes the same polymer in combination with a tackifier. PCT Patent Application No. WO 91/18043 describes use of ethylene/acrylate/carbon monoxide copolymers in combination with a tackifier as adhesives useful for a wide variety of substrates including PVC. These copolymer compositions however have limited utility as adhesives at higher temperatures.

Various means are used to counter the decreasing utility of hot-melt adhesives at higher temperatures. Curing or crosslinking after melt application is one approach of recent interest. Another approach is to use block or graft copolymers, with both a 'soft' and a 'hard' or 'strong' segment, where the hard block or graft segment maintains hardness and strength to higher temperatures, while the soft segment is responsible for maintaining useful adhesive qualities at ambient and lower temperatures. Common amongst those that have found adhesive utility are styrene-based block copolymers which find use for both pressure sensitive and conventional hot-melt adhesives. Polyamide grafted ethylene copolymers are disclosed in EP 0455412, where the polyamide graft acts as a means of improving the high temperature performance of ethylene based copolymer adhesives. In both cases, the harder and more temperature resistant segment tends to act as a separate phase. The two segments are generally not compatible, and are held together by covalent bonds. In the EP application it is suggested that best high temperature adhesive properties are achieved when the hard phase is the continuous phase. Grafting however has the disadvantage of increasing the viscosity of the polymer melt, thereby imposing a greater difficulty in achieving the necessary high fluidity for hot-melt application. In addition, graft polymers may be relatively difficult and expensive to produce.

Mere blending two polymers such as a harder and more temperature resistant polymer with a soft adhesive polymer however requires a certain 'compatibility' between the polymers of the blend will have no strength. High molecular weight polymers are often quite incompatible. If on the other hand the polymers are actually miscible, useful compositions may result but the harder more temperature resistant polymer will no longer maintain its independent behavior. Blending of polymeric materials as an approach to improving temperature resistance of hot-melts adhesives is not common. Blending is however a stock in trade of the adhesives industry, particularly for hot-melt adhesives. Such blending is typically with plasticizers, tackifiers and waxes. These are usually low molecular weight, low viscosity materials, designed to change various characteristics including increasing tackiness and reducing cost but particularly lowering the viscosity of the melt. Certain polyesters are well known as adhesives. Thermoplastic block-polyester elastomers however are generally high viscosity materials useful for many applications but are not known for use as adhesives. Blends of such block-polyesters with PVC are disclosed in U.S. Pat. No. 3,718,715 (Crawford et al.). The block-polyester is disclosed as being capable of functioning as a plasticizer for PVC.

Blends of such block-polyesters with ethylene copolymers are also known. U.S. Pat. No. 4,275,180 (Clarke) discloses such blends where the ethylene copolymer may contain units derived from a large variety of monomers including an alkyl acrylate and carbon monoxide. The choice of ethylene copolymer component is based on similarity in solubility parameter. The polymers are described as being useful as heat shrinkable elastomers with good resistance to hydrocarbons. No polymer containing carbon monoxide is exemplified. The blends are crosslinked and there is no suggestion the blends would be useful adhesives.

U.S. Pat. No. 4,739,012 (Hagman) discloses blends of a block-polyester elastomer with a partially crosslinked blend of an ethylene copolymer and polyvinyl chloride. The blend must contain polyvinyl chloride. While it is described as finding utility in adhesive and sealant applications, the viscosities of the blends are quite unsuitable for hot-melt adhesive applications.

There remains a need for an inexpensive way to improve the heat-resistance ethylene copolymer adhesives while maintaining sufficient fluidity for hot-melt application, excellent cohesive strength and excellent adhesivity to PVC.

SUMMARY OF THE INVENTION

The present invention satisfies this need by providing an ethylene copolymer based adhesive with improved heat resistance which is readily produced by melt-blending, and which has good high temperature adhesivity, particularly to PVC.

Accordingly, there is provided a hot-melt adhesive composition comprising, (A) 30-95 wt. % based on the weight of (A) plus (B) plus (C) of a direct ethylene copolymer having a melt index of from 5-2500, from monomer units comprising
  (i) ethylene
  (ii) 5-75 wt. % based on the direct ethylene copolymer, of a monomer selected from the group consisting of vinyl acetate and alkyl esters of unsaturated carboxylic acids wherein the unsaturated carboxylic acid is selected from the group consisting of acrylic acid, methacrylic acid, itaconic acid and maleic acid, and
  (iii) 0-30 wt. % based on the direct ethylene copolymer, of carbon monoxide, provided that if the wt. % carbon monoxide is less than 5 wt. %, the level of monomer (ii) is greater than 20 wt. %, and further provided that if carbon monoxide is present, monomer (ii) is not vinyl acetate, (B) 5-40 wt. % based on the weight of (A) plus (B) plus (C) of a thermoplastic block-polyester elastomer having a melting point below 215° C., (C) from 5-60 wt. % based on the weight of (A) plus (B) plus (C), of a compatible tackifier.

DETAILED DESCRIPTION OF THE INVENTION

In this disclosure, the word copolymer is meant to embrace polymers containing two or more than two monomers. When there is a need to indicate the number of monomers present the words e.g. bipolymer and terpolymer are used. A copolymer thus includes terpolymers as well as bipolymers. The phrase 'direct copolymer' describes a polymer made by copolymerizing two or more monomers together at the same time, as distinct from a graft copolymer where a second monomer may be polymerization-grafted onto a previously polymerized polymer chain. The word 'compatible' in describing a blend of materials is used to indicate that the components interact sufficiently that the blend is not friable and has some mechanical strength. The word 'miscible' is used to imply the ability to be mixed at a molecular level.

Adhesives are commonly 'formulated' with a wide variety of low molecular weight materials such as plasticizers, tackifiers, waxes and fillers to change and improve various properties or reduce viscosity. These materials are often essentially diluents however. Tackifiers which are compatible and have a high softening temperature, and fillers can increase temperature resistance slightly, but not sufficiently for many purposes.

It has now been found that mixtures of certain defined ethylene copolymers can be blended with certain defined thermoplastic block-polyester elastomers (block-polyesters) in certain proportions to yield a blend which, after formulation with tackifiers, produce useful adhesives particularly for PVC, and which have improved high temperature adhesive utility.

While not being limited to any particular theory, it is believed that the high temperature utility is improved because the defined ethylene copolymers may be miscible with only the soft segment of the block-polyester, while the hard crystalline segment with high temperature resistance is left substantially unaltered and available to improve high temperature utility.

The utility of these blends is limited to compositions containing no more than 40 wt. % of the block-polyester, and preferably between 5 and 30 wt. %. Readily available block-polyesters have a high melt viscosity, and above 40 wt. % block-polyester formulated blends remain too viscous. Application temperatures required to provide a sufficiently fluid melt to provide an adhesive bond to a substrate also increase, and this begins to cause thermal stability problems.

The melt index of available thermoplastic block-polyester elastomers is from about 0.5-20 g./10 min (as measured using ASTM D1238, using a 2.16 kg. weight, at temperatures appropriate for the melting point of the material from 190°-240° C.) and this range is suitable for the compositions of the present invention, though higher melt index resins, if available, would also be suitable. Generally, melt indices of above 4 are preferred.

Hot-melt adhesives have viscosities from about 50 up to about 1,000,000 centipoise (cps.). Generally, for most hot-melt applications, viscosities below about 200,000 cps are more suitable. Of course, the lower the viscosity of the ethylene copolymer, the more block-polyester allowable without exceeding a suitable application viscosity in formulated compositions. Lower viscosity block-polyesters also help in this regard.

The thermoplastic block-polyester elastomers used in compositions of this invention are composed of recurring long chain and short chain ester units randomly joined head-to-tail through ester linkages, the long chain ester units being represented by the formula

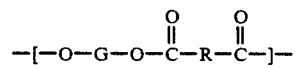

and the short chain ester units being represented by the formula

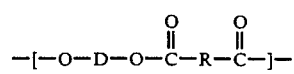

where G is a divalent radical remaining after the removal of terminal hydroxyl groups from at least one long chain glycol having a molecular weight from about 600 to 6000; R is a divalent radical remaining after removal of carboxyl groups from at least one dicarboxylic acid having a molecular weight less than about 300;

and D is a divalent radical remaining after removal of hydroxyl groups from at least one low molecular weight diol having a molecular weight less than 250. The short chain ester units provide hard crystalline blocks, and the long chain ester units provide amorphous soft blocks.

The block-polyesters useful for compositions of this invention can be conveniently made by conventional ester interchange reaction. A preferred procedure involves heating at about 150°-260° C. the dimethyl ester of a dicarboxylic acid with a long chain glycol and a molar excess of a short chain diol in the presence of an ester interchange catalyst. Detailed descriptions of the suitable methods are described in U.S. Pat. Nos. 3,023,192, 3,651,014, 3,718,715, 3,763,109, 3,776,146, and 3,784,520 all of which are herein incorporated by reference.

Dicarboxylic acids which can be used to produce the block-polyester polymers useful for the compositions of this invention are cycloaliphatic or aromatic dicarboxylic acids of a low molecular weight, less than about 300. Representative of such acids are 1,3-cyclohexane dicarboxylic acid, 1,4-cyclohexane dicarboxylic acid, phthalic acid, terephthalic and isophthalic acids and bibenzoic acid. Aromatic acids are preferred, and terephthalic and isophthalic acids most preferred.

Long chain glycols which can be used to produce these polymers are substantially linear glycols having hydroxyl groups on the chain which are terminal, or as nearly terminal as possible and having a molecular weight from about 600-6000. Long chain glycols which can be used to prepare block-polyester polymers useful for the compositions of this invention include poly(alkylene oxide) glycols wherein the alkylene group has 2-10 carbon atoms, preferably 2-4 carbon atoms, such as poly(ethylene oxide) glycol (PEO) poly(1,2- and 1,3-propylene oxide) glycol (PPO) poly(tetramethylene oxide) glycol, (PTMEG) and random or block copolymers of ethylene oxide and 1,2-propylene oxide.

Low molecular weight diols which can be used to produce block-polyester polymers useful in the compositions of this invention include aliphatic, cycloaliphatic and aromatic diols having a molecular weight less than about 250. Especially preferred are aliphatic diols containing 2-8 carbon atoms. Most preferred of these are ethylene glycol and 1,4-butane diol.

An especially preferred group of block-polyesters are those based on terephthalic acid or mixtures of terephthalic acid and isophthalic acid, 1,4-butane diol and poly(tetramethylene oxide) glycol or block copolymers of poly(propylene oxide) glycol and poly(ethylene oxide) glycol. These polymers are available from the Du Pont Company under the trade name HYTREL ®.

The amount of the soft segment relative to hard segment is determined by the relative amounts of poly(alkylene oxide) glycol and the low molecular weight diol. The more of the former, the lower the melting point. The melting point is also lowered by using mixtures of terephthalic and isophthalic acid rather than terephthalic acid alone. It is important that the amount of soft segment and/or the relative amounts of isophthalic and terephthalic acid be sufficient to provide a melting point for the block-polyester of below 215° C. While higher melting point block-polyesters have the potential of increasing the upper use temperature of adhesive blends containing them, higher temperatures are needed to make the adhesive blend and also to apply the adhesive blend to achieve adequate bonding. Both of these factors can be a disadvantage. For this reason, lower melting point block-polyesters are preferred. Preferably, the melting point, (Tm) is below 175° C.

The amounts of long chain diol required will differ depending on which acids are used and on which short chain diols are used. As an example, in a polymer based on a long chain glycol with 1,4-butylene terephthalate units only (Tm=234° C.), it can be calculated that the mole fraction of 1,4-butylene terephthalate units must be less than about 0.90 for a polymer melting point of 215° C.

The ethylene copolymers useful in this invention are either bipolymers of ethylene and vinyl acetate or an alkyl acrylate or terpolymers of ethylene, an alkyl acrylate and carbon monoxide. They must show some compatibility with PVC, some compatibility with the block-polyester elastomer, and have adequate melt stability for preparation and application of an adhesive composition containing them. Terpolymers of ethylene, vinyl acetate and carbon monoxide have inadequate melt stability for utility in this invention.

With ethylene bipolymers, sufficient compatibility with PVC to provide useful adhesive blends is achieved by using about 30-60 wt. % comonomer. Somewhat higher levels are required for less polar comonomers such as n-butyl acrylate than for methyl acrylate or vinyl acetate. Above 60 wt. % comonomer the polymer is difficult to handle. For terpolymers containing carbon monoxide, the level of the second monomer can be considerably less. There is an inverse relation between the amount of carbon monoxide and the amount of second monomer necessary to achieve useful adhesive compositions. Thus when no carbon monoxide is present, at least 30 wt. % of second monomer is necessary; at about 5 wt. % carbon monoxide about 20 wt. % second monomer is necessary and at 15 wt. % carbon monoxide as little as 5 wt. % second monomer is satisfactory. The preferred second monomer is n-butyl acrylate. Carbon monoxide is preferably present, and is preferably present at a level of from 5-20 wt. %, and most preferably 8-15 wt. %. When carbon monoxide is present the preferred level of second monomer is from 5-35 wt. % and the most preferred level is from 20-35 wt. %.

Suitable copolymers include ethylene/alkyl acrylate/carbon monoxide and ethylene/alkyl methacrylate/carbon monoxide terpolymers and ethylene/alkyl acrylate or methacrylate bipolymers wherein the alkyl group contains from 1-8 carbon atoms, and ethylene/vinyl acetate bipolymer. The most preferred copolymer is ethylene/n-butyl acrylate/carbon monoxide.

Ethylene copolymers are made with a much wider range of viscosity than are block-polyesters. Commercially available copolymers have viscosities corresponding to melt indices of as high as 3000 g./10 minutes. The copolymers for use in the present invention can have a melt index of from 1 to 2500 g./10 minutes (as measured by ASTM D-1238 at 190° C. using a 2.16 kg. weight). If the melt index of the copolymer is too low, the blend is viscous, and an excessive amount of tackifier is required, with a resultant dilution of the amount of polymer and decrease in strength of the blend. If the melt index is high, less tackifier is required to reduce viscosity but the polymer will have less strength and will contribute less strength to the formulated adhesive.

The viscosity of the thermoplastic block-polyester must also be considered. There will be a roughly inverse relationship between the viscosity of the copolymer/block-polyester blend and the amount of tackifier required to achieve a given formulated adhesive blend viscosity. There are clearly an almost unlimited number of possible combinations of copolymer viscosity, block-polyester viscosity, and tackifier level and type which are suitable. However, copolymers with a melt index of from 5-1000 are preferred and copolymers with a melt index of 10-500 are most preferred.

Suitable methods of preparation of either the bipolymers or terpolymers of this invention are well known. These direct copolymers are preferably prepared in a continuous stirred reactor at elevated pressures and temperatures. Preparation of carbon monoxide containing terpolymers is described in detail in U.S. Pat. No. 3,780,140. Preparation of copolymers such as ethylene-/alkyl acrylate may be carried out by similar techniques. Preparation of ethylene/vinyl acetate copolymers is similar and is also described in U.S. Pat. No. 4,497,941. Both patents are herein incorporated by reference.

The blend of ethylene copolymer and block-polyester alone has too high a viscosity to be used as a hot melt adhesive, and a viscosity diluent is required. Tackifiers and plasticizers can reduce viscosity, but plasticizers, which are often fluid at room temperature, generally also reduce high temperature utility. Tackifiers may be crystalline or glassy solids. They serve to increase tackiness or adhesivity, but also can reduce viscosity at application temperatures without reducing high temperature utility to the same extent. Tackifiers with a high softening temperature are preferred in this regard. The softening temperature of tackifiers is often identified as its 'Ring and Ball' Softening temperature (RBT), referring to a particular test of the same name. RBTs above 60° C. are preferred. The proportion and identity of tackifier is also selected to cooperate with the copolymer/block-polyester elastomer blend to produce the fluidity desired at the hot melt application temperature, generally about 250°–400° F. (121°–204° C.). Fluidities of the adhesive compositions of the present invention are quoted as Brookfield Viscosity at 350° F. (177° C.) in cps., measured using a Brookfield viscometer. The amount of tackifier needed may be from 5–60 wt. %. For lower melt index copolymers higher levels within this range will be needed. Generally, between 15 and 40 wt. % tackifier is preferred. Plasticizers can be present in small quantities. However because of their negative effect on high temperature utility, it is preferred to use less than 5 wt. %, and most preferably no plasticizer at all should be used.

Suitable tackifiers must be compatible with or even miscible with the polymer blend. Compatibility may be observed by blending polymer and tackifier in the melt, and then cooling. Upon cooling to room temperature, when compatible, the composition is flexible rather than brittle, and is usually clear or only slightly hazy in appearance.

Beyond the need for a compatible tackifier with a high RBT, the choice of most suitable tackifier is somewhat empirical. The behavior of a given tackifier in a the blend of the present invention is more difficult to predict than in systems where the polymer component is a single non-block copolymer. While not limited to any particular theory, this may be because more complex compatibility behavior exists when the polymeric component is a blend of two polymers, one of which is itself a block copolymer of two different polymer types. A slight increase in the content of one ingredient might generate a change in compatibility between ingredients or with an ingredient and one part of the block copolymer, or there may be a sudden change in compatibility of ingredients with temperature. Thus in some instances, a tackifier which appears to be generally compatible, produces a formulation with good adhesion at elevated temperatures, but which has relatively poor room temperature adhesivity (e.g. poor RT peel strength). Or a tackifier with a relatively high RBT will, in some formulations, give good high temperature behavior and peel strength but, in other formulations, either or both of these properties will be poorer than might be expected. Thus, while the blend of an ethylene copolymer, a block-polyester and a tackifier of this invention produces a desirable increase in high temperature utility, some routine experimentation may be necessary to obtain the best balance of other properties, particularly RT peel strength.

In general, suitable tackifiers are the more polar tackifiers. They may be selected from:

a) Wood gum or tall oil rosin acids. They can be hydrogenated, disproportionated or mildly polymerized.

b) Esters of the various classes of rosin acids referred to in a) above. Alcohols suitable for preparing these esters include mono-and polyethylene glycols, glycerol, pentaerythritol and related products c) Terpene resins d) Dicyclopentadiene-aromatic hydrocarbon resins such as those described in U.S. Pat. No. 3,023,200 covering PICCOVAR ® resins manufactured by Pennsylvania Industrial Chemical Company.

(e) Low molecular weight resins based on styrene and or substituted styrenes. The last category is preferred.

In scouting tests, a tackifier found to be highly suitable was PICCOTEX ® LC. PICCOTEX ® 75 and Foral ® 105 reduced high temperature utility as measured by Shear Adhesion Failure Temperature (SAFT) values and reduced RT peel strength in some formulations. PICCOTEX ® LC and PICCOTEX ® 75 are both similar chemically (alpha-methyl styrene/vinyl toluene copolymers) but differ in RBT (about 105° and 75° C. respectively). FORAL ® 105 is a Rosin ester with an RBT of 105, yet while it appeared to be quite compatible with the polymer system, SAFT of test formulations were reduced. However, it is likely that careful formulation might allow many tackifiers to be used. Since PICCOTEX ® LC was found most suitable in several formulations, most experimental formulations were made with this tackifier.

Paraffin wax, commonly used in hot melt adhesives is not compatible with the adhesive compositions of this invention. However it is possible to use small amounts of more polar waxes such as Carnuba wax, preferably less than 5 wt. %.

It is also possible to add filler to the composition. The use of filler may provide a small supplemental increase in upper temperature utility over that achieved by use of thermoplastic block-polyester. Fillers are also commonly added to reduce cost. However, adhesivity may be reduced and fillers increase melt viscosity. Not more than 20 wt. % filler is allowable or the viscosity increases unacceptably. Preferably there should be less than 10 wt. % filler, and most preferably below 5 wt. %. In general, the amount should be kept to a minimum. If a particular end-use utility can be satisfied without filler, then it is generally preferable to omit it. Suitable fillers include calcium carbonate and barium sulfate.

Antioxidants are generally used in the formulation of ethylene copolymer hot-melt adhesives, and it was found that they were desirable for best performance of formulations of the present invention. Suitable antioxidants include typical hindered phenols such as butylated hydroxytoluene (BHT), ETHYL® 330, IRGANOX® 1010 or 1098 as well as phosphites, butyl zimate. IRGANOX® 1010 which is a hindered phenol manufactured by Ciba-Geigy has been found particularly advantageous.

Adhesive compositions of the present invention can be made by melt blending of the ingredients. If all ingredients including the block-polyester are blended together in one batch, it is advantageous to use high shear mixing equipment such as an extruder with a suitable mixing screw or other high shear mixing equipment such as a Braebender plasticorder to accommodate the high viscosity of the block-polyesters. An alternative approach is to first make a concentrate of the block-polyester with a lower viscosity ethylene copolymer using high-shear mixing equipment, then use conventional hot-melt mixing equipment for completing the formulation. Commercially, adhesives manufacturers may not have extrusion equipment, and generally employ a variety of standard low shear mixing equipment. Such manufacturers would need to use such a block-polyester concentrate in preparing various formulations.

Of course, if lower viscosity block-polyesters were available, the need to prepare an ethylene/block-polyester concentrate could be obviated.

The viscosity of the formulated hot-melt adhesive composition should be between 1000 and 200,000 cps at 177° C. preferably below 100,000 cps, and most preferably less than 70,000 cps. The broad viscosity range corresponds very approximately to a melt index range of 10,000 to 50 g./10 min. (ASTM D1238, at 190° C., 2.16 kg. weight).

PREPARATION OF ADHESIVE BLENDS

Because available block-polyester elastomers are relatively viscous, most of the experimental samples were prepared using a direct blend procedure, using a laboratory scale plasticorder which provides sufficient shear to mix the block-polyesters with the other ingredients. The plasticorder used was a PLD Data Processing Plasticorder manufactured by C. W. Braebender, which is basically a static twin-screw extruder. The ingredients were added to the Braebender all at once, and then held at 190° C. for twenty minutes, using a screw speed of 50 rpm.

Some samples were prepared in two stages to test the general concept of use of a concentrate let-down procedure. A concentrate of 50% block-polyester and 50% ethylene copolymer was made using the Braebender plasticorder. The remaining ethylene copolymer and tackifier were then put in a small can inside a heated block at 190° C. The appropriate amount of concentrate was added to the can and the mixture stirred with an air driven motor. Samples appeared to have comparable viscosity and appearance to similar samples made without a concentrate let-down procedure.

TEST PROCEDURES

Viscosity was measured in a constant temperature viscometer (Brookfield Digital Viscometer Model RVT-DVII) at 350° F. (177° C.) and a shear rate near 1 reciprocal seconds.

Room temperature Peel Strength (RT Peel), measured in pounds per linear inch (PLI), was measured as follows. Samples were tested for adhesion to rigid PVC film, 10 mil thick, by placing a thin film of adhesive, about 3 mil thick, between two film of PVC. The bonds were prepared on a Sentinel Laboratory Heat Sealer, model 12-ASL, which consist of two 1 in. wide heated bars that are brought together at about 190° C., psi, and 1 sec. The finished bond was then peeled apart at a 180° angle on an Instrom Model 1000, at 2 in. per minute. Three separate tests for each bond were made and then the average force needed to pull apart the bonds was recorded. Peel strength values below 3 are unacceptable and values above 7 are desirable and preferred.

The Shear Adhesion Failure temperature (SAFT) test provides a guide to the cohesive of the adhesive as temperature is increased. It was conducted in a temperature programmed oven (an 8 band oven shear test manufactured by Chemsultants International; PSTC approved equipment Model HTM 150), programmed for the temperature to increase at the rate of 33° C. per hour. Bonds of PVC/Adhesive/PVC were prepared as described above. The samples were tested in a shear mode. One end of the PVC film was clamped onto the sample holder and then a 100 g. weight was clamped onto the opposite end of the other PVC film. When the weight falls it activates a switch which records the time of failure, from which the temperature of failure is computed from the rate of temperature rise. The SAFT value obtained will depend on the particular copolymer used, but SAFT values are preferably 95° C. and above.

In the following examples, two different block-polyesters were used. Their compositions are as follows:

Block-polyester BP1 is made from (expressed for a small gram quantity preparation to illustrate relative amounts (26.9 g dimethyl terephthalate (DMT), 72.5 g. TERETHANE® 2100 (PTMEG of MW 2100) and 14 g (about a 40% excess) of 1,4-butane diol. It has a melting point of 170° C.

Block-polyester BP2 is made from 3.12 g. DMT, 9.1 g dimethyl isophthalate (DMI), 53.7 g. of MB2123 which is a block polyether of PPO and PEO (30%) of MW 2150. mfg. by Shell, and 25 g (about a 40% stoichiometric excess) of 1,4-butane diol. It has a melting point of 156° C.

The compositions of the ethylene copolymers used were as follows:

(Melt Index (MI) was measured using ASTM D1238 at 190° C., 2.16 kg. weight.)

Ethylene terpolymer ET1 is an ethylene/n-butyl acrylate/carbon monoxide terpolymer with a weight ratio of monomers 65/25/10, with a MI of 100 and a melting point of 63° C.

Ethylene terpolymer ET2 is an ethylene/n-butyl acrylate/carbon monoxide terpolymer with a weight ratio of 60/30/10 and a melt index of 6 and a melting point of 57° C.

Ethylene terpolymer ET3 is an ethylene/n-butyl acrylate/carbon monoxide terpolymer with a weight ratio of 65//25/10, with a melt index of 500, and a melting point of 63° C.

Ethylene terpolymer ET4 is an ethylene/n-butyl acrylate/carbon monoxide terpolymer with a weight ratio of 80/5/15, with a melt index of 500 and a melting point of 95° C.

Ethylene bipolymer EB1 is an ethylene/vinyl acetate polymer with 40 wt. % vinyl acetate and an MI of 57.

Ethylene bipolymer EB2 is an ethylene/vinyl acetate polymer with 28 wt. % vinyl acetate and an MI of 800.

The following tackifiers were used:

T1; PICCOTEX ® LC is a copolymer of vinyl toluene and a-methyl styrene with an RBT of 105° C.

T2; PICCOTEX ® 75 is a copolymer of vinyl toluene and a-methyl styrene with an RBT of 75° C.

T3; FORAL ® 105 is a hydrogenated Rosin Ester with an RBT of 105° C.

All are trademarks of, and manufactured by Hercules Incorporated.

IRGANOX ® 1010 was used in all compositions at a level of 1 wt. %. It is a hindered phenol manufactured by Ciba-Geigy.

EXAMPLE

Adhesive blend formulations were prepared and tested in the manner described above. Compositions of the formulations and properties are shown in Table 1 which also shows properties of some of the blend components alone. The samples illustrate that significant increase in SAFT can be achieved, but that within the numerical limits of the components levels of this invention, careful formulation with regard to amount and level of tackifier is necessary to achieve desirable compositions.

COTEX ® LC (R5 and R6). Note that a terpolymer with a low level (5 wt. %) of n-butyl acrylate, R4, by itself has a high SAFT value and quite low viscosity (corresponding to a high melt index of 500), but RT peel strength is extremely low. While this ethylene copolymer alone is stiff enough to have good high temperature properties, without formulation, peel strength is quite inadequate. Compositions R5 and R6 are blends of two terpolymers with different levels of a preferred tackifier. RT peel is now adequate. They show some variability in SAFT values, but the values are either only slightly above that of the terpolymer alone (92 for R6 versus 87 for R1, the polymer alone), or below that of the terpolymer alone (79 versus 87° C.).

Blends 1,2,3 and 4,5,6 are designed to evaluate different tackifiers in compositions with constant levels of each ingredient type, using two different block-polyesters. In both series only PICCOTEX ® LC gave compositions with both good SAFT and acceptable RT peel strength. With the other tackifiers, PICCOTEX ® 75 and FLORAL ® 105, there is a drop in SAFT and/or RT peel strength. Formulations 1 and 4, while showing reasonable SAFT and RT peel are not optimum formulations, the SAFT being little improved over some compositions without block-polyester (e.g compositions R3 and R6). This shows the need for adjustments in formulation to fully achieve the improvement obtainable with this system.

Exactly the same three components as in sample 4 are used in samples 7–16, but in this case all samples show a significant increase in SAFT. Blends 8, 10 and 11 with very good SAFT, have relatively poor RT peel

TABLE 1

| | | ADHESIVE BLEND COMPOSITIONS | | | | |
|---|---|---|---|---|---|---|
| Blend # | Polyester/Wt. % | E. Copol. (S)/Wt. % | Tackif./Wt. % | Visc. CPS | RT. Peel PLI | SAFT °C. |
| R1 | 0 | ET1, 100 | 0 | 120000 | 16. | 87 |
| R2 | 0 | ET2, 100 | 0 | THTM | — | — |
| R3 | 0 | ET3, 100 | 0 | 34000 | 7.0 | 93 |
| R4 | 0 | ET4, 100 | 0 | 27000 | 0.4 | 120 |
| R5 | 0 | ET1, 70; ET2, 10 | T1, 20 | 101000 | 13 | 79 |
| R6 | 0 | ET1, 55; ET2, 10 | T1, 35 | 43000 | 11 | 92 |
| 1 | BP2, 20 | ET1, 60 | T1, 20 | 85800 | 7.5 | 95 |
| 2 | BP2, 20 | ET1, 60 | T2, 20 | 88800 | 3.8 | 78 |
| 3 | BP2, 20 | ET1, 60 | T3, 20 | 82400 | 1.5 | 75 |
| 4 | BP1, 20 | ET1, 60 | T1, 20 | 87800 | 8.3 | 92 |
| 5 | BP1, 20 | ET1, 60 | T2, 20 | 94400 | 8.7 | 87 |
| 6 | BP1, 20 | ET1, 60 | T3, 20 | 85200 | 4.6 | 78 |
| 7 | BP1, 20 | ET1, 70 | T1, 10 | 165000 | 8.8 | 118 |
| 8 | BP1, 20 | ET1, 55 | T1, 25 | 87400 | 3.2 | 149 |
| 9 | BP1, 10 | ET1, 55 | T1, 35 | 38000 | 7.8 | 117 |
| 10 | BP1, 20 | ET1, 40 | T1, 40 | 47200 | 3.3 | 131 |
| 11 | BP1, 10 | ET1, 40 | T1, 50 | 17467 | 3.3 | 120 |
| 12 | BP1, 30 | ET1, 40 | T1, 30 | 100800 | 7.5 | 120 |
| 13 | BP1, 30 | ET1, 60 | T1, 10 | 215000 | 8.7 | 128 |
| 14 | BP1, 10 | ET1, 70 | T1, 20 | 65200 | 17.8 | 95 |
| 15 | BP1, 5 | ET1, 70 | T1, 25 | 56000 | 9.0 | 110 |
| 16 | BP1, 10 | ET1, 76 | T1, 14 | 105000 | 9.4 | 110 |
| R7 | 0 | EB1, 100 | 0 | THTM | 21.0 | NM |
| R8 | 0 | EB2, 100 | 0 | 16000 | 3.0 | NM |
| 17 | BP1, 10 | EB1, 55 | T1, 35 | 83400 | 7.0 | 91 |
| 18 | BP1, 10 | —; EB2, 65 | T1, 25 | 8450 | 2.9 | 111 |
| 19 | BP1, 15 | —; EB2, 70 | T1, 15 | 13200 | 4.9 | 90 |
| R5 | BP1, 15 | EB1, 35; EB2, 50 | 0 | 79000 | 6.5/9.1* | 85 |
| R6 | BP1, 15 | EB1, 25; EB2, 60 | 0 | 73400 | 5.3 | 86 |

THTM, Too high to measure.
NM, Not measured.
All blends made using direct blend procedure.
*Determined at 177° C., 10 psi., 5 seconds.

R1 to R6 are reference compositions showing the SAFT values for ethylene/n-butyl acrylate/carbon monoxide terpolymers alone (R1 to R4) and blends of some ethylene/n-butyl acrylate/carbon monoxide terpolymers with different levels of tackifier PICstrength, while the other samples have good RT peel, (above 7.0). Lower viscosity compositions are generally those with higher tackifier and lower levels of block polyester. Sample 9 shows an excellent balance of low viscosity, adequate peel strength and high SAFT. There appears to be some scatter in the data. This may be due to non-optimized heat seal conditions. Clear trends in property values as a result of an increase in one ingredient do not seem to be readily discernable. Nevertheless, a few experiments are sufficient to arrive at a composition with improved SAFT and adequate RT peel.

Some samples were made using ethylene/vinyl acetate copolymers. Formulation 17 has an acceptable combination of SAFT and peel strength. SAFT values have not been measured on ethylene/vinyl acetate compositions alone, though it is believed they would be quite low, particularly for high vinyl acetate copolymers, compared with the terpolymers described above. As a result, it is believed that the presence of block-polyester has a comparable beneficial effect on SAFT compared with compositions without block-polyester as for the terpolymer compositions. However, it is believed that achieving good tackifier compatibility with the ethylene/vinyl acetate block-polyester blend is more difficult, and useful compositions require careful formulation.

I claim:

1. A hot-melt adhesive composition consisting essentially of
   (A) 30-95 wt. % based on the weight of (A) plus (B) plus (C) of a direct ethylene copolymer having a melt index of from 5-2500, from monomer units comprising
      (i) ethylene
      (ii) 5-75 wt. % based on the direct ethylene copolymer of a monomer selected from the group consisting of vinyl acetate and alkyl esters of unsaturated carboxylic acids wherein the carboxylic acid is selected from the group consisting of acrylic acid, methacrylic acid, itaconic acid and maleic acid, and,
      (iii) 0-30 wt. % based on the direct ethylene copolymer of carbon monoxide, provide that if the wt. % carbon monoxide is less than 5 wt. % the level of monomer (ii) is greater than 20 wt. %, and further provided that if carbon monoxide is present, monomer (ii) is not vinyl acetate,
   (B) 5-40 wt. % based on the weight of (A) plus (B) plus (C) of a thermoplastic block-polyester elastomer having a melting point below 215° C.,
   (C) from 5-60 wt. % based on the weight of (A) plus (B) plus (C) of a compatible tackifier, wherein said hot-melt adhesive composition has a viscosity of 1000 to about 200,000 cps at 177° C.

2. The composition of claim 1 wherein the direct copolymer is ethylene/n-butyl acrylate/carbon monoxide terpolymer.

3. The composition of claim 1 wherein the thermoplastic block-polyester elastomer is present in an amount between 5 and 30 wt. % based on (A) plus (B) plus (C), and has a melting point below 175° C.

4. The composition of claim 3 wherein the direct copolymer is ethylene/n-butyl acrylate/carbon monoxide terpolymer.

5. The composition of claim 4 wherein the direct ethylene/n-butyl acrylate/carbon monoxide terpolymer has 20-35 wt. % units derived from n-butyl acrylate and 8-15 wt. % units derived from carbon monoxide.

6. The composition of claim 5 wherein the melt index of the direct copolymer is from 10-500.

7. The composition of claim 6 wherein the tackifier is an alpha-methyl styrene/vinyl toluene copolymer and is present in an amount from 15-40 wt. %, wherein said hot-melt adhesive composition has a viscosity of 1000 to about 200,000 cps at 177° C.

8. The composition of claim 2 wherein the tackifier is an alpha-methyl styrene/vinyl toluene copolymer and is present in an amount from 15-40 wt. %, wherein said hot-melt adhesive composition has a viscosity of 1000 to about 200,000 cps at 177° C.

9. The composition of claim 2 having a RT peel strength above 7.0 pounds per linear inch.

10. The composition of claim 1 in the form of an adhesive layer applied to a polyvinyl chloride substrate.

11. The composition of claim 1 wherein the direct copolymer is ethylene/vinyl acetate containing at least 30 wt. % units derived from vinyl acetate.

* * * * *